US007453177B2

(12) United States Patent
Highfill et al.

(10) Patent No.: US 7,453,177 B2
(45) Date of Patent: Nov. 18, 2008

(54) MAGNETIC COUPLING DEVICES AND ASSOCIATED METHODS

(75) Inventors: Greg S. Highfill, Snoqualmie, WA (US); Loern Halverson, Seattle, WA (US); Chris Will, Seattle, WA (US); Ricardo Contreras, Seattle, WA (US)

(73) Assignee: MagnaDrive Corporation, Bellevue, WA (US)

( * ) Notice: Subject to any disclaimer, the term of this patent is extended or adjusted under 35 U.S.C. 154(b) by 213 days.

(21) Appl. No.: 11/280,926

(22) Filed: Nov. 16, 2005

(65) Prior Publication Data

US 2006/0170304 A1 Aug. 3, 2006

Related U.S. Application Data (60) Provisional application No. 60/629,689, filed on Nov. 19, 2004.

(51) Int. Cl.
*H02K 49/00* (2006.01)

(52) U.S. Cl. .................. 310/75 D; 310/103; 310/112

(58) Field of Classification Search .......... 310/75 D, 310/75 R, 103, 105, 112–114; 192/80, 84.5, 192/94; 464/29
See application file for complete search history.

(56) References Cited

U.S. PATENT DOCUMENTS

| 3,573,517 | A | * | 4/1971 | Osterstrom ............ 310/103 |
| 3,659,126 | A | * | 4/1972 | Whipker ............... 310/92 |
| 4,163,164 | A | * | 7/1979 | Pieters ................. 310/103 |
| 4,598,899 | A | | 7/1986 | Cooper |
| 4,747,583 | A | | 5/1988 | Gordon et al. |
| 4,898,367 | A | | 2/1990 | Cooper |
| 4,930,986 | A | | 6/1990 | Cooper |
| 4,954,167 | A | | 9/1990 | Cooper |
| 5,203,681 | A | | 4/1993 | Cooper |
| 5,308,045 | A | | 5/1994 | Cooper |
| 5,330,328 | A | | 7/1994 | Cooper |
| 5,473,209 | A | | 12/1995 | Lamb |
| 5,477,093 | A | | 12/1995 | Lamb |
| 5,477,094 | A | | 12/1995 | Lamb |
| 5,637,997 | A | * | 6/1997 | Hore et al. ............ 324/207.16 |
| 5,662,725 | A | | 9/1997 | Cooper |
| 5,668,424 | A | | 9/1997 | Lamb |
| 5,678,807 | A | | 10/1997 | Cooper |

(Continued)

FOREIGN PATENT DOCUMENTS

CA 2009022 7/1991

(Continued)

*Primary Examiner*—Tran Nguyen
(74) *Attorney, Agent, or Firm*—Perkins Coie LLP (57) ABSTRACT

The magnetic coupling system of the present invention overcomes drawbacks experienced by the prior art. A coupling system in accordance with one embodiment of the invention comprises a rotor assembly having a first mount portion connectable to a first shaft. A conductor assembly having a second mount portion is connectable to a second shaft. The second mount portion has first and second sections coupleable to each other and being independently positionable adjacent to the magnet holder. A first electro-conductive member is attached to the first section and positioned adjacent to the magnet holder. A second electro-conductive member is attached to the second section and positioned adjacent to the magnet holder. The first and second electro-conductive members are positioned adjacent to each other and spaced apart from the magnet holder by a gap.

27 Claims, 7 Drawing Sheets

U.S. PATENT DOCUMENTS

| | | | |
|---|---|---|---|
| 5,691,587 | A | 11/1997 | Lamb |
| 5,712,519 | A | 1/1998 | Lamb |
| 5,712,520 | A | 1/1998 | Lamb |
| 5,739,627 | A | 4/1998 | Lamb |
| 5,834,872 | A | 11/1998 | Lamb |
| 5,880,548 | A | 3/1999 | Lamb |
| 5,903,075 | A | 5/1999 | Lamb |
| 5,909,073 | A | 6/1999 | Lamb |
| 5,944,496 | A | 8/1999 | Cooper |
| 5,951,243 | A | 9/1999 | Cooper |
| 6,005,317 | A | 12/1999 | Lamb |
| 6,027,685 | A | 2/2000 | Cooper |
| 6,043,578 | A | 3/2000 | Lamb |
| 6,054,788 | A * | 4/2000 | Dombrovski et al. ....... 310/103 |
| 6,072,258 | A | 6/2000 | Lamb |
| 6,093,000 | A | 7/2000 | Cooper |
| 6,123,523 | A | 9/2000 | Cooper |
| 6,242,832 | B1 | 6/2001 | Lamb |
| 6,303,074 | B1 | 10/2001 | Cooper |
| 6,337,527 | B2 | 1/2002 | Lamb |
| 6,345,964 | B1 | 2/2002 | Cooper |
| 6,398,525 | B1 | 6/2002 | Cooper |
| 6,577,037 | B2 | 6/2003 | Killen et al. |
| 6,682,430 | B2 | 1/2004 | Killen |
| 6,689,310 | B1 | 2/2004 | Cooper |
| 6,723,276 | B1 | 4/2004 | Cooper |
| 6,750,557 | B2 | 6/2004 | Poteet et al. |
| 6,912,451 | B2 | 6/2005 | Poteet et al. |
| 2002/0132671 | A1 | 9/2002 | Killen |
| 2004/0076533 | A1 | 4/2004 | Cooper |
| 2004/0115079 | A1 | 6/2004 | Cooper |
| 2004/0262825 | A1 | 12/2004 | Cooper |
| 2005/0116473 | A1 | 6/2005 | Poteet et al. |

FOREIGN PATENT DOCUMENTS

| | | |
|---|---|---|
| CA | 2244251 | 6/1998 |
| EP | 0408165 | 1/1991 |

* cited by examiner

MAGNETIC COUPLING DEVICES AND ASSOCIATED METHODS

CROSS-REFERENCE TO RELATED APPLICATION

The present non-provisional patent application claims the benefit of and priority to U.S. Provisional Patent Application No. 60/629,689 filed Nov. 19, 2004, which is incorporated herein by reference thereto.

TECHNICAL FIELD

The current invention is directed to coupling systems, and more particularly toward magnetic coupling systems.

BACKGROUND

When a magnetic disk containing permanent magnets arranged so that opposing magnets on the disk are of opposite polarity is rotated between two non-ferrous electro-conductive disks, eddy currents are generated in the rotating disk resulting in magnetic friction between the electro-conductive disk and the magnetic disk. This magnetic friction will urge the magnetic disks to rotate. Accordingly, the electro-conductive disks and the magnetic disks can be used to couple two shafts together in order to transfer rotational motion between the shafts. The electro-conductive disks and magnetic disks can be used in a magnetic break, a magnetic brake, or other coupling devices.

SUMMARY

The magnetic coupling system of the present invention overcomes drawbacks experienced by the prior art. A coupling system in accordance with one embodiment of the invention comprises a rotor assembly having a first mount portion connectable to a first shaft. A conductor assembly having a second mount portion is connectable to a second shaft. The second mount portion has first and second sections coupleable to each other and being independently positionable adjacent to the magnet holder. A first electro-conductive member is attached to the first section and positioned adjacent to the magnet holder. A second electro-conductive member is attached to the second section and positioned adjacent to the magnet holder. The first and second electro-conductive members are positioned adjacent to each other and spaced apart from the magnet holder by a gap.

DETAILED DESCRIPTION

Figure 1:
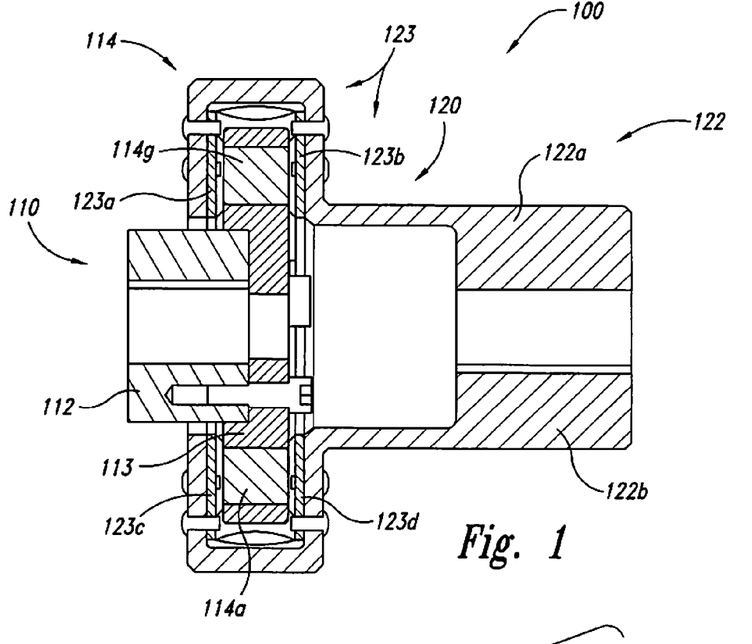
FIG. 1 is a partially schematic cross-sectional elevation of a magnetic coupling system in accordance with embodiments of the invention.
Figure 2:
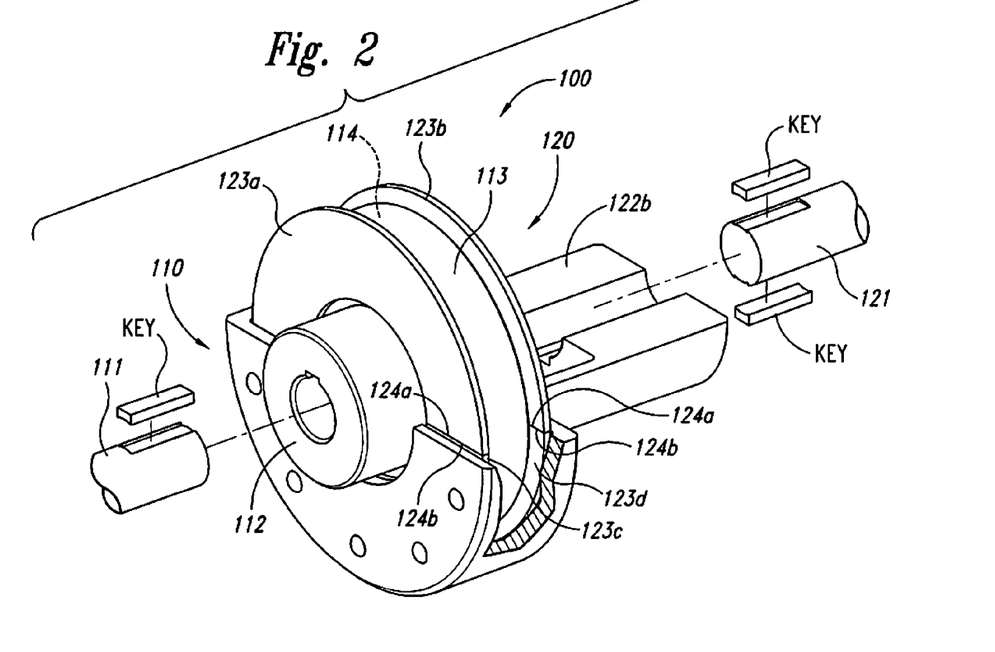
FIG. 2 is an isometric illustration of a portion of the magnetic coupling system shown in FIG. 1 where a second shaft mount has been removed.
Figure 3A:
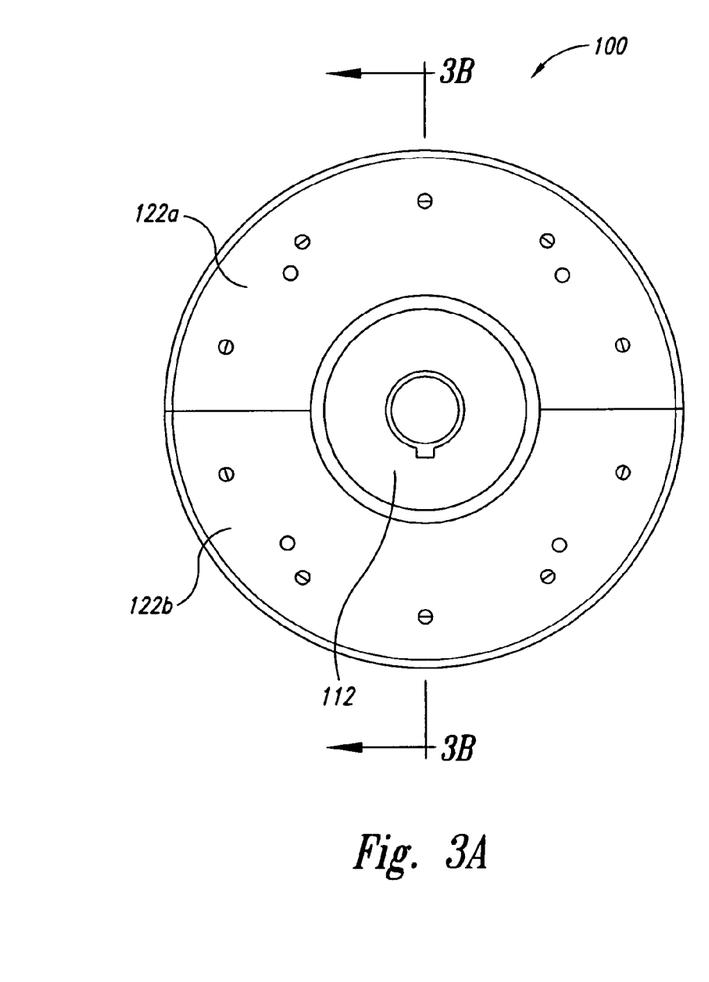
FIG. 3A is a partially schematic front elevation of the magnetic coupling system shown in FIG. 1.
Figure 3B:
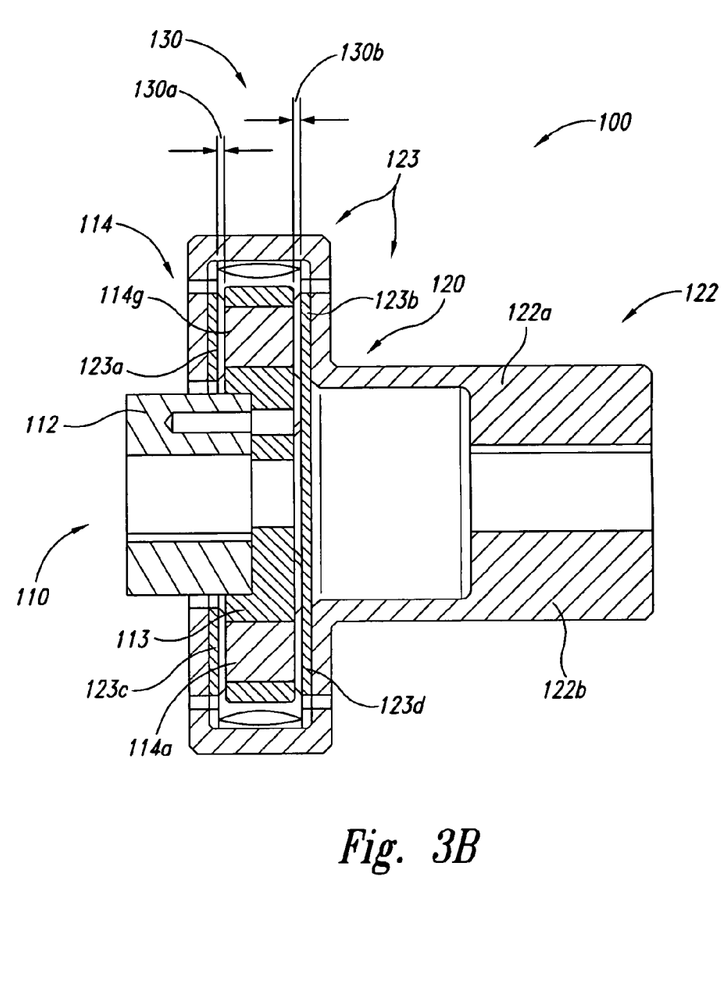
FIG. 3B is a partially schematic cross-sectional elevation of the magnetic coupling system shown in FIG. 3A taken along line A-A.
Figure 4A:
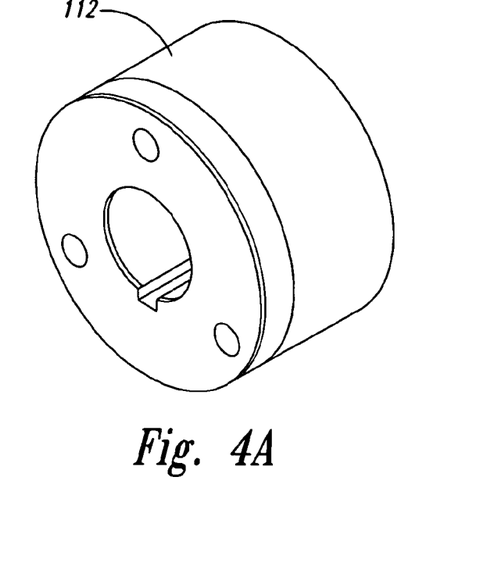
FIG. 4A is an isometric illustration of a first shaft mount of the magnetic coupling system shown in FIG. 1.
Figure 4B:
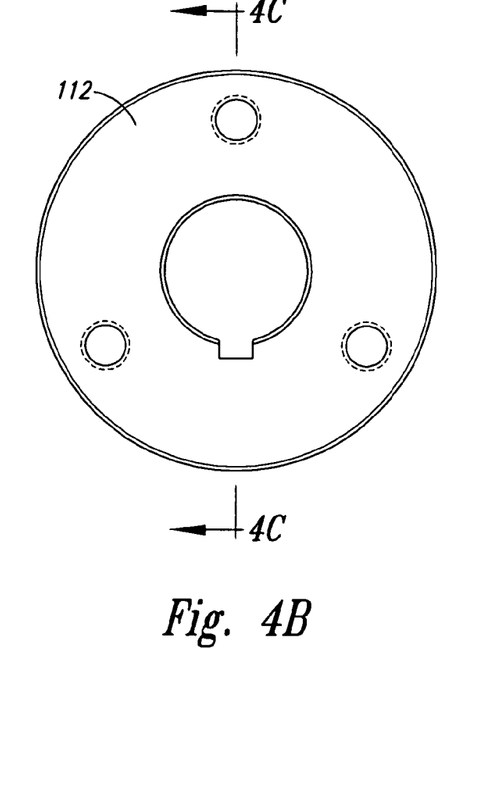
FIG. 4B is a partially schematic front elevation of the first shaft mount shown in FIG. 4A.
Figure 4C:
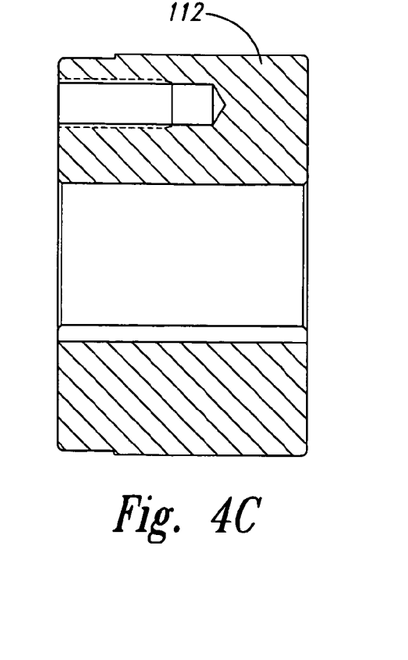
FIG. 4C is a partially schematic cross-sectional elevation of the first shaft mount shown in FIG. 4B taken along line A-A.
Figures 5A, 5B, 5C, 5D:
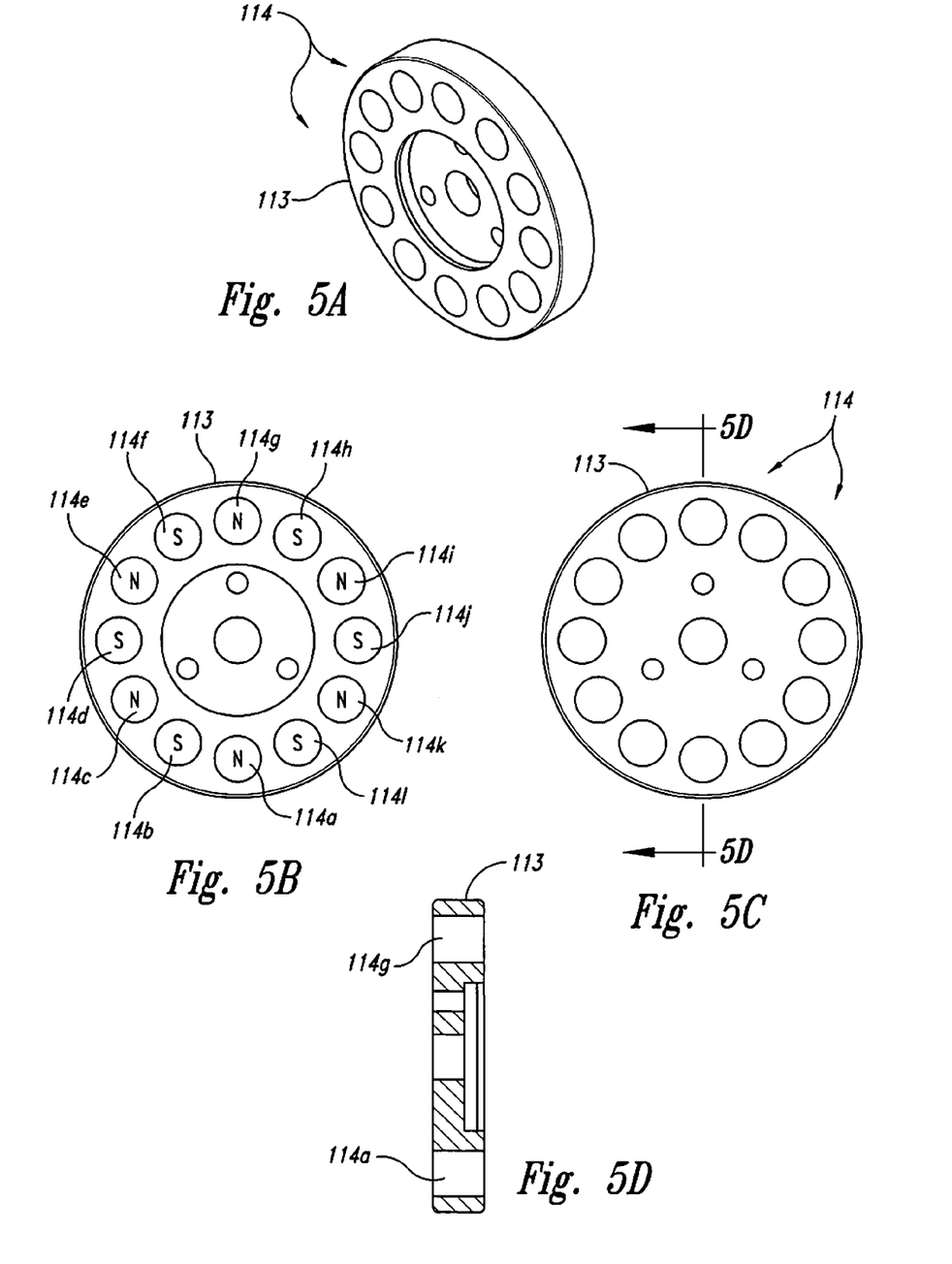
FIG. 5A is an isometric illustration of a magnet holder and magnets of the magnetic coupling system shown in FIG. 1.
FIG. 5B is a partially schematic front elevation of the magnet holder and magnets shown in FIG. 5A.
FIG. 5C is a partially schematic back elevation of the magnet holder shown in FIG. 5A with the magnets removed.
FIG. 5D is a partially schematic cross-sectional elevation of the magnet holder and magnets shown in FIG. 5C taken along line A-A.
Figure 6A:
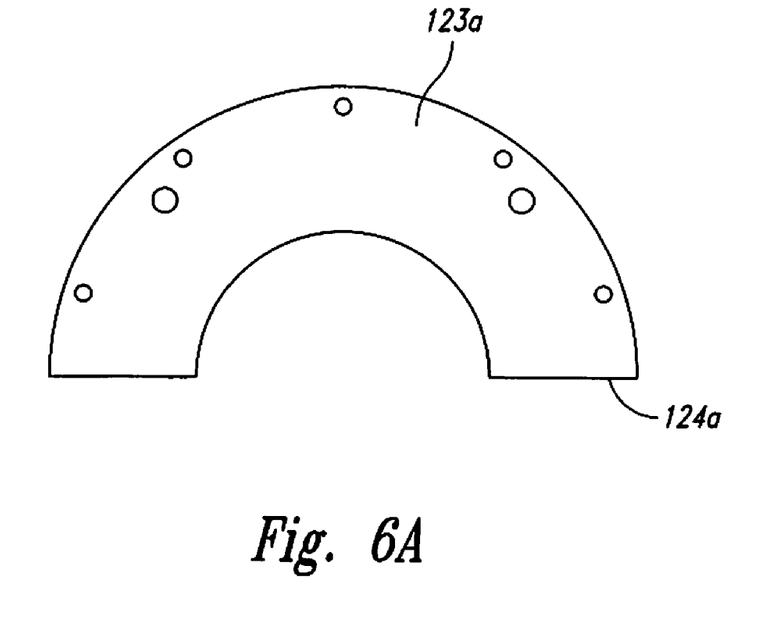
FIG. 6A is a partially schematic front elevation of an electro-conductive material section of the magnetic coupling system shown in FIG. 1.
Figure 6B:
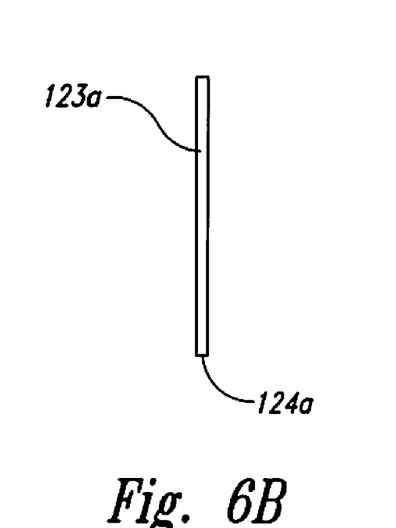
FIG. 6B is a partially schematic side elevation of the electro-conductive material section shown in FIG. 6A.
Figures 7A, 7B, 7C:
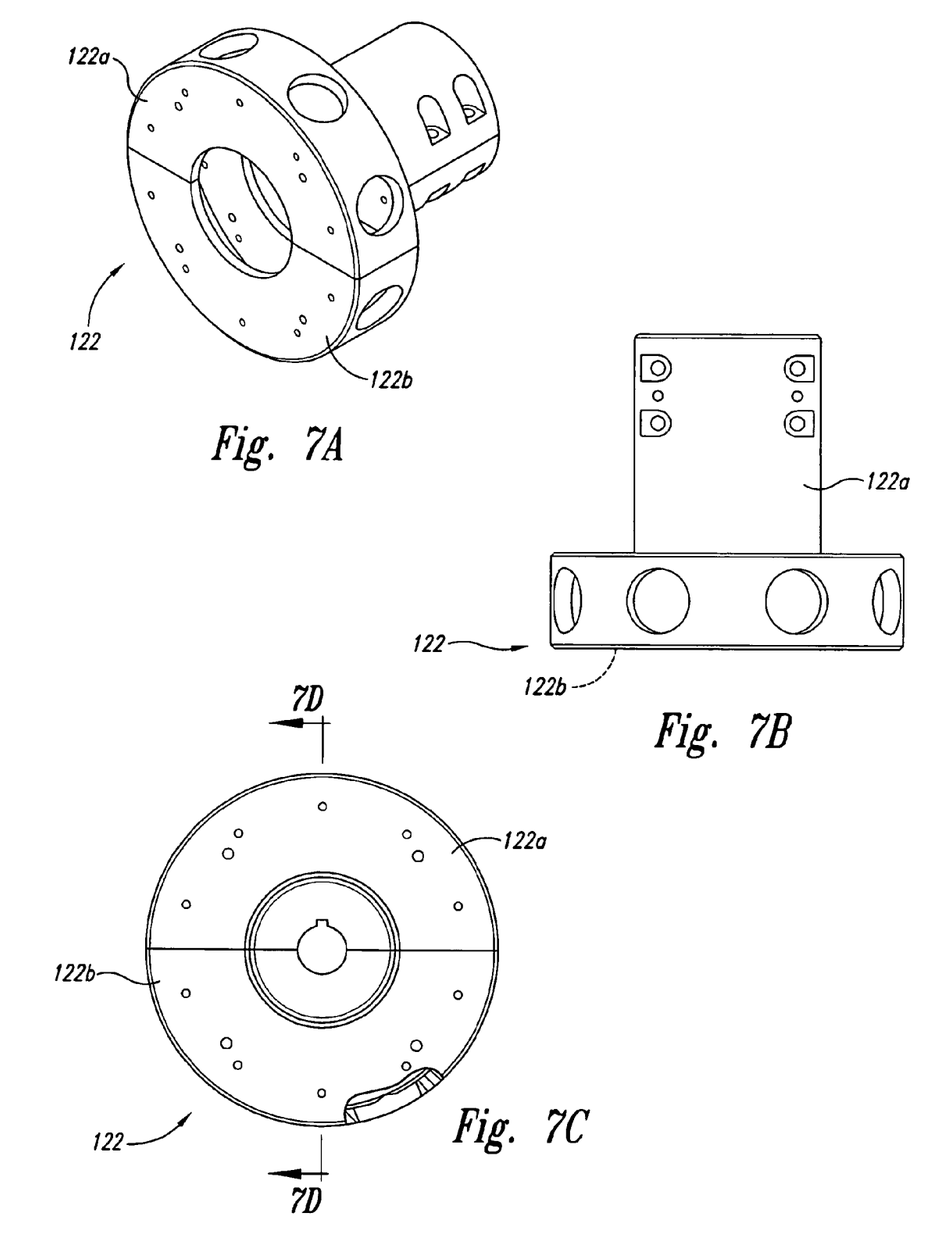
FIG. 7A is an isometric illustration of a second shaft mount of the magnetic coupling system shown in FIG. 1.
FIG. 7B is a partially schematic top plan view of the second shaft mount shown in FIG. 7A.
FIG. 7C is a partially schematic front elevation of the second shaft mount shown in FIG. 7A.
Figure 7D:
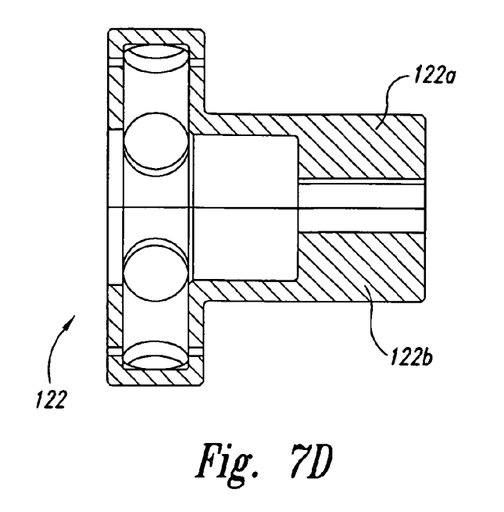
FIG. 7D is a partially schematic cross-sectional elevation of the second shaft mount shown in FIG. 7C taken along line A-A.
Figure 7E:
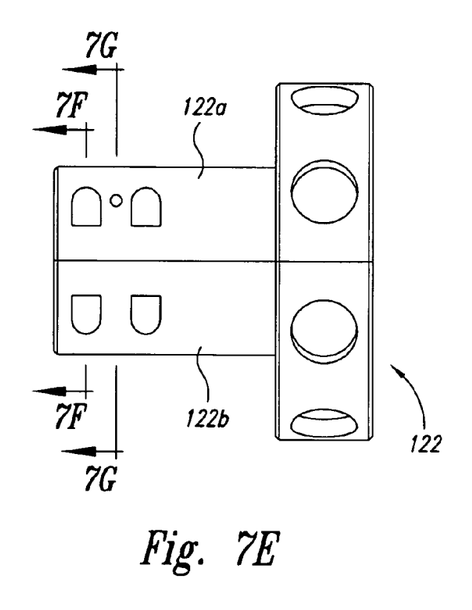
FIG. 7E is a partially schematic side elevation of the second shaft mount shown in FIG. 7A.
Figure 7F:
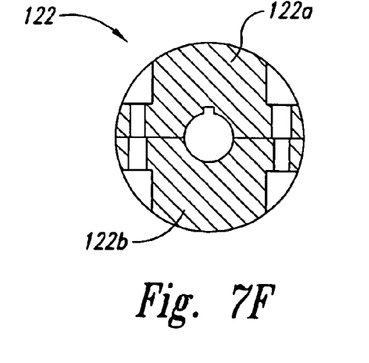
FIG. 7F is a partially schematic cross-sectional elevation of the second shaft mount shown in FIG. 7E taken along line B-B.
Figure 7G:
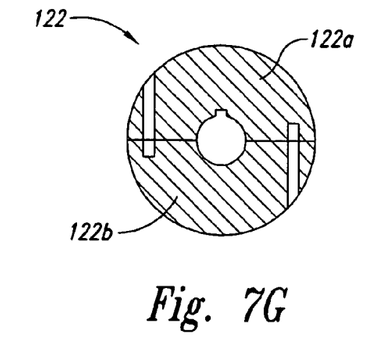
FIG. 7G is a partially schematic cross-sectional elevation of the second shaft mount shown in FIG. 7E taken along line C-C.

The present disclosure describes magnetic coupling devices and associated methods. Several specific details of the invention are set forth in the following description and in FIGS. 1-7G to provide a thorough understanding of certain embodiments of the invention. One skilled in the art, however, will understand that the present invention may have additional embodiments, and that other embodiments of the invention may be practiced without several of the specific features described below. For example, while selected dimensions may be provided on various Figures, these dimensions are for illustrative purposes only. In other embodiments, the magnetic coupling device and associated components can have significantly different dimensions than are shown in the illustrated embodiment.

The magnetic coupling system 100, shown in FIGS. 1-7G, can include a magnet rotor assembly 110 and a conductor assembly 120. The magnet rotor assembly 110 can be coupled to a first shaft 111 (shown in FIG. 2) and the conductor assembly 120 can be coupled to a second shaft 121 (shown in FIG. 2). The magnet rotor assembly 110 and/or the conductor assembly 121 can be coupled to the respective shaft(s) using various methods, for example, by using fasteners, a friction/interference fit, set screws, and/or shaft keys (shown in FIG. 2).

When the magnet rotor assembly 110 and a conductor assembly 120 are coupled to the first and second shafts 111 and 121, the magnetic coupling system 100 can be used to transfer rotational movement of one shaft to the other shaft (e.g., coupling the shafts). For example, a motor can apply a rotational force (e.g., torque) to the first shaft 111 and the magnetic coupling system 100 can transmit the rotational force to the second shaft 121. In certain embodiments, the magnetic coupling system 100 can be used as a clutch-type system to allow engagement and disengagement (e.g., coupling and decoupling) of the first shaft 111 and the second shaft 121. In other embodiments, the magnetic coupling system 100 can be used to buffer movement between the first shaft 111 and the second shaft 121 by allowing one shaft to smoothly transition to another rotational speed in response to a sudden change in the rotation of the other shaft.

The magnetic rotor assembly 110 can include a first shaft mount 112, one or more magnet holders 113, and one or more magnets 114 in each holder. The magnet holder 113 can be made of various materials, for example, a plastic, a metal, or a ceramic. In certain embodiments, the first shaft mount 112 and the magnet holder 113 can be an integral unit. In the illustrated embodiment, the magnet holder 113 is coupled to the first shaft mount 112, which in turn can be coupled to the first shaft 111 (shown in FIG. 2). Twelve magnets 114 are coupled to the magnet holder 113. The twelve magnets are shown as a first magnet 114a, a second magnet 114b, a third magnet 114c, a fourth magnet 114d, a fifth magnet 114e, a sixth magnet 114f, a seventh magnet 114g, an eighth magnet 114h, a ninth magnet 114i, a tenth magnet 114j, an eleventh magnet 114k, and a twelfth magnet 114l. As shown in the illustrated embodiment, the magnets can be arranged symmetrically around the magnet holder 113 with adjacent magnets arranged so that they present opposite poles on each side of the magnet holder 113. Other embodiments can have more or fewer magnets 114 and/or other arrangements and geometry (e.g., magnets can be stacked end-to-end, positive pole opposite negative pole, in openings around a magnet holder having a different size and shape than the magnet holder 113 shown in the illustrated embodiment).

The conductor assembly can include a second shaft mount 122 and an electro-conductive material 123. In the illustrated embodiment, the second shaft mount 122 includes two portions shown as a top portion 122a and a bottom portion 122b. Other embodiments can have more or fewer portions and/or other arrangements (e.g., a left portion and a right portion). In the illustrated embodiment, the top portion 122a and the bottom portion 122b are configured to be coupled around a shaft using fasteners.

The second shaft mount 122 can carry one or more electro-conductive material sections 123. Four electro-conductive material sections are shown in the illustrated embodiment, as a first electro-conductive material section 123a, a second electro-conductive material section 123b, a third electro-conductive material section 123c, and a fourth electro-conductive material section 123d. The first and second electro-conductive material sections 123a and 123b are coupled to the top shaft mount section 122a and the third and fourth electro-conductive material sections 123c and 123d are coupled to the bottom shaft mount portion 122b. In other embodiments, the conductor assembly can include more or fewer electro-conductive material sections 123 and/or other arrangements (e.g., the electro-conductive material sections 123 can be integral with the second shaft mount 122). When the second shaft mount 122 is coupled to the second shaft 121 (shown in FIG. 2), the second shaft 121, the second shaft mount 122, and the electro-conductive material sections 123 can rotate as a unit.

The split arrangement of the conductor assembly 120, described above, can simplify handling, installation, and adjustment of the magnetic coupling system 100. For example, the magnet rotor assembly 110 can be installed on to the first shaft 111 (shown in FIG. 2). The first shaft mount 112 can be positioned on the first shaft 111 so that the end of the first shaft 111 is flush with a face of the first shaft mount 112. The first shaft mount 112 can then be coupled to the first shaft 111 so that the conductor assembly 120 and the first shaft 111 can turn as a unit. In the illustrated embodiment, one or more shaft keys and an interference fit (e.g., the first shaft mount 112 is pressed onto the first shaft 111) are used to couple the first shaft 111 to the magnet rotor assembly 110. As discussed above, in other embodiments, other methods (e.g., fasteners and/or set screws) can be used to couple the first shaft mount 112 to the first shaft 111.

The top portion 122a and bottom portion 122b of the second shaft mount 122 can then be positioned around the magnet holder 113. The magnet rotor assembly 110 and the conductor assembly 120 can be configured so that when the second shaft mount 122 is positioned around the magnet holder 113, the first shaft mount 112 and the second shaft mount 122 fit together to provide a selected amount of space between the magnet holder 113, with the associated magnets 114, and the electro-conductive material sections 123. For example, a gapping tool or gauge can be inserted through the holes shown in the second shaft mount 122 to measure and/or adjust a gap between a portion of the second shaft mount 122 and the magnet holder 113 before the second shaft mount 122 is coupled to the second shaft 121. In other embodiments, the magnetic coupling system 100 can use other methods for controlling/adjusting the gap between the magnets 114/magnet holder 113 and the electro-conductive material sections 123 (e.g., a spacer element with a bushing centrally located between the magnet holder 113 or the first shaft mount 112 and the second shaft mount 122).

Once the conductor assembly 120 is positioned relative to the magnet holder 113 and first shaft mount 112, the second shaft mount 122 can be coupled to the second shaft 121 so that the second shaft 121 and the conductor assembly can turn as a unit. In the illustrated embodiment, one or more shaft keys and fasteners (e.g., fasteners that cause the first and second portions 122a and 122b of the second shaft mount 122 to tighten around the second shaft 121) are used to couple the second shaft mount 122 to the second shaft 121. As discussed above, in other embodiments, other methods (e.g., an interference fit and/or set screws) can be used to couple the first shaft mount 112 to the first shaft 111.

As discussed above, with the magnet rotor assembly 110 coupled to the first shaft 111 and the conductor assembly 120 coupled to the second shaft 121 when a rotational force is imparted to one shaft the force can be transferred to the other shaft via the magnetic coupling system 100. For example, if the first shaft 111 is rotated, the first shaft mount 112, the magnet holder 113, and the magnets 114 will rotate with the first shaft 111. As the magnets rotate relative to the electro-conductive material sections 123, magnetic friction will cause the electro-conductive material sections 123 to move. As the electro-conductive material section 123 moves the second shaft mount 122 will move, thereby moving the second shaft 121.

The position of the magnets 114 relative to the conductive material sections 123 can determine the strength of the magnetic friction and thereby the ability of the magnetic coupling system 100 to transfer rotational forces and/or motion between one shaft and the other. For example, increasing the space or gap between the magnets 114 and the electro-conductive material sections 123, shown as a first gap 130a and a second gap 130b in FIG. 3B, can reduce the strength of the magnetic friction between the magnets 114 and the electro-conductive material sections 123. In other embodiments, the magnets 114 can be positioned to rotate so that only a portion of each magnet 114 passes between electro-conductive material sections 123 instead of the entire magnet 114 passing between electro-conductive material sections 123, thereby reducing the strength of the magnetic friction between the magnets 114 and the electro-conductive material sections 123.

Other variables can also affect the strength of the magnetic friction between the magnets 114 and the electro-conductive material sections 123. For example, the thickness of the electro-conductive material sections 123, whether the electro-conductive material sections 123 are solid, laminated, or plated, and the number of magnets 114 can all affect the strength of the magnetic friction between the magnets 114 and the electro-conductive material sections 123. Additionally, the material placed behind the electro-conductive material sections 123 can affect the strength of the magnetic friction. For example, if the electro-conductive materials sections 123 are copper and are backed by a ferrous material (e.g., at least a portion of the second shaft mount 122 is made of steel) the magnetic friction can be stronger than if the electro-conductive material sections 123 are backed by a non-ferrous material (e.g., aluminum and/or plastic).

The manner in which the electro-conductive material sections 123 are positioned relative to each other can also affect the strength of the magnetic friction and/or the consistency of the magnetic friction as the magnet rotor assembly 110 and the conductor assembly 120 rotate. For example, if the first electro-conductive material section 123a and the third electro-conductive material section 123c are positioned such that they form a continuous ring around the first shaft mount 112, as the magnet holder 113 rotates, the magnetic friction will be more consistent than if there is a gap between the first electro-conductive material section 123a and the third electro-conductive material section 123c. The more consistent the magnetic friction is as the magnet rotor assembly 110 and the conductor assembly 120 rotate, the smoother the rotational force and/or motion can be transferred from one shaft to the other.

Various methods can be used to position the electro-conductive material sections 123 to avoid gaps and/or to make combined electro-conductive material sections 123 appear to be more like a single electro-conductive material section 123 (e.g., make the combined sections appear to be more nearly homogenous) with respect to the magnetic friction created by the relative motion between the magnets 114 and the electro-conductive material sections 123. For example, the edges 124a and 124b (FIG. 2) between the electro-conductive material sections 123 where the electra- conductive material sections 123 meet and/or are joined (e.g., between the first electro- conductive material section 123a and the third electro-conductive material section 123c ) can be configured to improve this characteristic. Depending on the materials used and the selected configuration, edges 124a and 124b of adjoining electro-conductive material sections 123 can have various arrangements, including being straight cut, cut at corresponding angles to fit together, cut in saw tooth shapes that can interlock, cut to form a tongue and groove arrangement, and/or cut to have rounded shapes (e.g., one concave and one convex). In other embodiments, there may not be an edge joint (e.g., a solid, continuous ring/disk can be used).

A feature of some of the embodiments described above is that the magnet rotor assembly and the conductor assembly of the magnetic coupling system can be handled as separate pieces, which makes handling and installation easier than with current systems. Additionally, even though the conductor assembly and the magnetic rotor assembly can be handled separately they can be easily adjusted once installed and/or during the installation process. Accordingly, an advantage of these features is that the easy handling, easy installation, and/or easy adjustment of the magnetic coupling system can save time and money during the installation and/or maintenance of these systems.

Embodiments of the invention described above can be applied to a very wide variety of systems using a magnetic coupling or drive. For example, features of embodiments described above can be used in conjunction with selected embodiments and/or features described in U.S. Pat. Nos. 5,477,093; 5,477,094; 5,668,424; 5,691,587; 5,712,519; 5,473,209; and 4,826,150.

The above-detailed embodiments of the invention are not intended to be exhaustive or to limit the invention to the precise form disclosed above. Specific embodiments of, and examples for, the invention are described above for illustrative purposes, but those skilled in the relevant art will recognize that various equivalent modifications are possible within the scope of the invention. For example, whereas steps are presented in a given order, alternative embodiments may perform steps in a different order. The various aspects of embodiments described herein can be combined and/or eliminated to provide further embodiments. Although advantages associated with certain embodiments of the invention have been described in the context of those embodiments, other embodiments may also exhibit such advantages. Additionally, none of the foregoing embodiments need necessarily exhibit such advantages to fall within the scope of the invention.

In general, the terms used in the following claims should not be construed to limit the invention to the specific embodiments disclosed in the specification unless the above-detailed description explicitly defines such terms. In addition, the inventors contemplate various aspects of the invention in any number of claim forms. Accordingly, the inventors reserve the right to add claims after filing the application to pursue such additional claim forms for other aspects of the invention.

We claim:

1. A coupling system connectable to first and second shafts, the system comprising:
    a rotor assembly having a first mount portion connectable to the first shaft, at least one magnet holder connected to the first mount portion; and
    a conductor assembly having a second mount portion connectable to the second shaft, the second mount portion having first and second sections coupleable to each other and being independently positionable adjacent to the magnet holder, a first electro-conductive member is attached to the first section and positioned adjacent to the magnet holder, and a second electro-conductive member is attached to the second section and positioned adjacent to the magnet holder, the first and second electro-conductive members being positioned adjacent to each other and spaced apart from the magnet holder by a gap.

2. The coupling system of claim 1 wherein the rotor has at least one magnet connected to the magnet holder.

3. The coupling system of claim 1 wherein the first and second electro-conductive members are coplanar.

4. The coupling system of claim 1 wherein the first and second electro-conductive members are in direct engagement with each other.

5. The coupling system of claim 1 wherein the first and second electro-conductive members engage each other to define a joint therebetween.

6. The coupling system of claim 1 wherein the first electro-conductive member has an first joining edge and the second electro-conductive member has a second joining edge that mates with the first joining edge.

7. The coupling system of claim 1 wherein the first electro-conductive member has an first joining edge having a first shape and the second electro-conductive member has a second joining edge having a second shape that mates with the first shape.

8. The coupling system of claim 1 wherein the first mount portion is releasably connected to the second mount portion.

9. The coupling system of claim 1 wherein the first mount portion is releasably fastened to the second mount portion when the conductor assembly is positioned about the rotor assembly.

10. The coupling system of claim 1 wherein the conductor assembly includes a third electro-conductive member connected to the first mount and spaced apart from the first electro-conductive member with at least a first portion of the magnet holder therebetween.

11. The coupling system of claim 1 wherein the conductor assembly includes third and fourth electro-conductive members, the third electro-conductive member being connected to the first section and spaced apart from the first electro-conductive member with at least a first portion of the magnet holder therebetween, the fourth electro-conductive member being connected to the second section and spaced apart from the second electro-conductive member with at least a second portion of the magnet holder therebetween.

12. The coupling system of claim 1 wherein the conductor assembly includes third and fourth electro-conductive members, the third electro-conductive member being connected to the first section and the fourth electro-conductive member being connected to the second section, the first and third electro-conductive members forming a substantially continuous first ring of electro-conductive material adjacent to the magnet holder, and the second and fourth electro-conductive members forming a substantially continuous second ring of electro-conductive material adjacent to the magnet holder with at least a second portion of the magnet holder therebetween.

13. The magnetic coupling system of claim 1 wherein the first and second sections and the first and second electro-conductive members are rotatable together as a unit relative to the magnet holder.

14. The magnetic coupling system of claim 1 wherein the position of the first and second electro-conductive members relative to the magnet holder is adjustable.

15. A magnetic coupling system connectable to first and second shafts, the system comprising:
a magnet rotor assembly having a first shaft mount connectable to the first shaft, at least one magnet holder connected to the first shaft mount, and at least one magnet connected to the magnet holder;
a conductor assembly having a second shaft mount connectable to the second shaft and electro-conductive members coupled to the second shaft mount, the second shaft mount having separate first and second mount portions coupleable to each other about the magnet holder, the electro-conductive members including first and second members, the first member being attached to the first mount portion and positioned adjacent to the magnet holder, and the second member being attached to the second mount portion and positioned adjacent to the magnet holder, the first mount portion and the first member being positionable adjacent to the magnet holder before the second mount portion and second member are positioned adjacent to the magnet holder, wherein the first and second electro-conductive members are coplanar.

16. The magnetic coupling system of claim 15 wherein the first and second members engage each other along a joint.

17. The magnetic coupling system of claim 15 wherein the first mount portion and the second mount portion are physically attached to each other.

18. The magnetic coupling system of claim 15 wherein the first mount portion is releasably connected to the second mount portion.

19. The magnetic coupling system of claim 15 wherein the first mount portion is releasably fastened to the second mount portion when the conductor is positioned about the magnet rotor assembly.

20. A magnetic coupling system connectable to first and second shafts, the system comprising:
a magnet rotor assembly having a first shaft mount connectable to the first shaft, at least one magnet holder connected to the first shaft mount, and at least one magnet connected to the magnet holder;
a conductor assembly having a second shaft mount connectable to the second shaft and electro-conductive members coupled to the second shaft mount, the second shaft mount having separate first and second mount portions coupleable to each other about the magnet holder, the electro-conductive members including first and second members, the first member being attached to the first mount portion and positioned adjacent to the magnet holder, and the second member being attached to the second mount portion and positioned adjacent to the magnet holder, the first mount portion and the first member being positionable adjacent to the magnet holder before the second mount portion and second member are positioned adjacent to the magnet holder,
wherein the electro-conductive members includes a third member connected to the first mount portion and spaced apart from the first member with at least a first portion of the magnet holder therebetween.

21. A magnetic coupling system connectable to first and second shafts, the system comprising:
a magnet rotor assembly having a first shaft mount connectable to the first shaft, at least one magnet holder connected to the first shaft mount, and at least one magnet connected to the magnet holder;
a conductor assembly having a second shaft mount connectable to the second shaft and electro-conductive members coupled to the second shaft mount, the second shaft mount having separate first and second mount portions coupleable to each other about the magnet holder, the electro-conductive members including first and second members, the first member being attached to the first mount portion and positioned adjacent to the magnet holder, and the second member being attached to the second mount portion and positioned adjacent to the magnet holder, the first mount portion and the first member being positionable adjacent to the magnet holder before the second mount portion and second member are positioned adjacent to the magnet holder, wherein the electro-conductive members includes third and fourth members, the third member being connected to the first mount portion and spaced apart from the first member with at least a first portion of the magnet holder therebetween, the fourth member being connected to the second mount portion and spaced apart from the second member with at least a second portion of the magnet holder therebetween.

22. A magnetic coupling system connectable to first and second shafts, the system comprising:

a magnet rotor assembly having a first shaft mount connectable to the first shaft, at least one magnet holder connected to the first shaft mount, and at least one magnet connected to the magnet holder;

a conductor assembly having a second shaft mount connectable to the second shaft and electro-conductive members coupled to the second shaft mount, the second shaft mount having separate first and second mount portions coupleable to each other about the magnet holder, the electro-conductive members including first and second members, the first member being attached to the first mount portion and positioned adjacent to the magnet holder, and the second member being attached to the second mount portion and positioned adjacent to the magnet holder, the first mount portion and the first member being positionable adjacent to the magnet holder before the second mount portion and second member are positioned adjacent to the magnet holder, wherein the electro-conductive members includes a third member connected to the first mount portion, the first and third members forming a substantially continuous first ring of electromagnetic material adjacent to the magnet holder.

23. The magnetic coupling system of claim 15 wherein the first and second mount portions and the first and second members are rotatable together as a unit relative to the magnet holder.

24. The magnetic coupling system of claim 15 wherein the first and second members are positioned at a fixed distance apart from the magnet holder.

25. The magnetic coupling system of claim 15 wherein the position of the first and second members relative to the magnet holder is adjustable.

26. The magnetic coupling system of claim 15 wherein the rotor has at least one magnet connected to the magnet holder.

27. The magnetic coupling system of claim 15, further comprising the first and second shafts, and a drive mechanism operatively coupled to at least one of the first and second shaft.

* * * * *